(12) United States Patent
Gundersen et al.

(10) Patent No.: US 12,732,828 B2
(45) Date of Patent: Sep. 8, 2026

(54) PREEMPTIVE RADIO ENERGIZATION BASED ON NETWORK DEMAND

(71) Applicant: Cisco Technology, Inc., San Jose, CA (US)

(72) Inventors: Tina Gundersen, Hampshire (GB); Clark A. Carty, Brunswick, OH (US); Kasi R. Nalamalapu, Pleasanton, CA (US); Rajesh Tarakkad Venkateswaran, Bangalore (IN); Carlos Pignataro, Cary, NC (US); Eric A. Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 421 days.

(21) Appl. No.: 18/314,363

(22) Filed: May 9, 2023

(65) Prior Publication Data

US 2024/0381114 A1 Nov. 14, 2024

(51) Int. Cl.
*H04W 16/20* (2009.01)
*H04W 16/22* (2009.01)

(52) U.S. Cl.
CPC ......... *H04W 16/20* (2013.01); *H04W 16/225* (2013.01)

(58) Field of Classification Search
CPC ... H04W 84/12; H04W 24/02; H04W 52/143; H04W 16/20; H04W 16/225
See application file for complete search history.

(56) References Cited

U.S. PATENT DOCUMENTS 9,860,257 B1 1/2018 Kumar et al.
2011/0280170 A1 11/2011 Bowser et al.
2012/0108249 A1* 5/2012 Talwar .............. H04W 72/0473 455/450
2012/0225663 A1* 9/2012 Gupta .................. H04W 64/00 455/456.1

(Continued)

FOREIGN PATENT DOCUMENTS

CN 108322274 B 8/2020
CN 113434294 A 9/2021

(Continued)

OTHER PUBLICATIONS

Zhang, S., et al., "Traffic Prediction Based Power Saving in Cellular Networks: A Machine Learning Method," ACM Digital Library, SIGSPATIAL'17, Nov. 7, 2017.

(Continued)

*Primary Examiner* — Shukri Taha
(74) *Attorney, Agent, or Firm* — Rutan & Tucker, LLP; Ravi Mohan; Marc A. McClain

(57) ABSTRACT

Various methods, systems, and/or processes are described herein that rely on a demand-based optimization logic that aims to improve wireless network performance. It involves selecting a floorplan, identifying access points associated with the floorplan, and assessing network demands of client devices within the area. Based on the demands, a demand-based power configuration is generated to adjust the output power of one or more access points. This configuration is transmitted to the identified access points to optimize network performance. By adjusting the power of access points to match the needs of client devices, more efficient and effective wireless network usage is realized.

19 Claims, 10 Drawing Sheets

(56) References Cited

U.S. PATENT DOCUMENTS

| | | | | |
|---|---|---|---|---|
| 2015/0227183 | A1 | 8/2015 | Carroll | |
| 2017/0156068 | A1* | 6/2017 | Frenger | H04L 43/16 |
| 2017/0164402 | A1* | 6/2017 | Zhang | H04W 72/542 |
| 2018/0206198 | A1 | 7/2018 | Shanks et al. | |
| 2020/0288296 | A1* | 9/2020 | Fiorese | H04W 64/006 |
| 2021/0273858 | A1 | 9/2021 | Radovanovic et al. | |
| 2022/0104119 | A1* | 3/2022 | Chiselko | H04W 24/02 |

FOREIGN PATENT DOCUMENTS

| | | | | |
|---|---|---|---|---|
| EP | 4408083 | A1 * | 7/2024 | H04W 52/0206 |
| WO | WO-2020013884 | A1 * | 1/2020 | G06Q 10/04 |
| WO | WO-2024008518 | A1 * | 1/2024 | H04B 17/345 |

OTHER PUBLICATIONS

International Search Report and Written Opinion for International Application No. PCT/US2024/028418, mailed Jul. 30, 2024, 15 Pages.

* cited by examiner 200
210
220
230
240
215
225
235
2.4 Ghz
5 Ghz
6 Ghz 250
210
230
215
2.4 Ghz
5 Ghz
6 Ghz

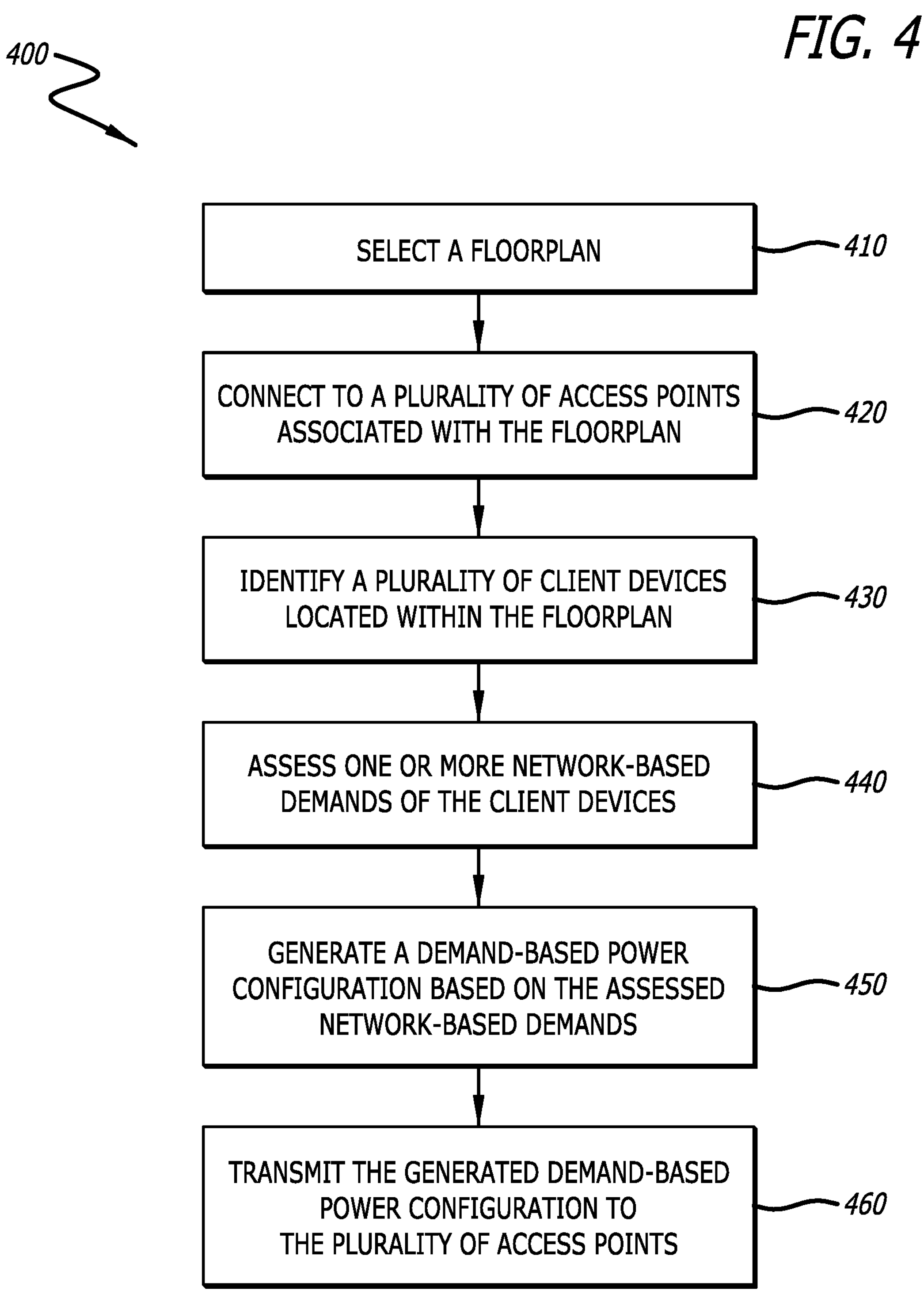
FIG. 4
400
SELECT A FLOORPLAN
410
CONNECT TO A PLURALITY OF ACCESS POINTS ASSOCIATED WITH THE FLOORPLAN
420
IDENTIFY A PLURALITY OF CLIENT DEVICES LOCATED WITHIN THE FLOORPLAN
430
ASSESS ONE OR MORE NETWORK-BASED DEMANDS OF THE CLIENT DEVICES
440
GENERATE A DEMAND-BASED POWER CONFIGURATION BASED ON THE ASSESSED NETWORK-BASED DEMANDS
450
TRANSMIT THE GENERATED DEMAND-BASED POWER CONFIGURATION TO THE PLURALITY OF ACCESS POINTS
460

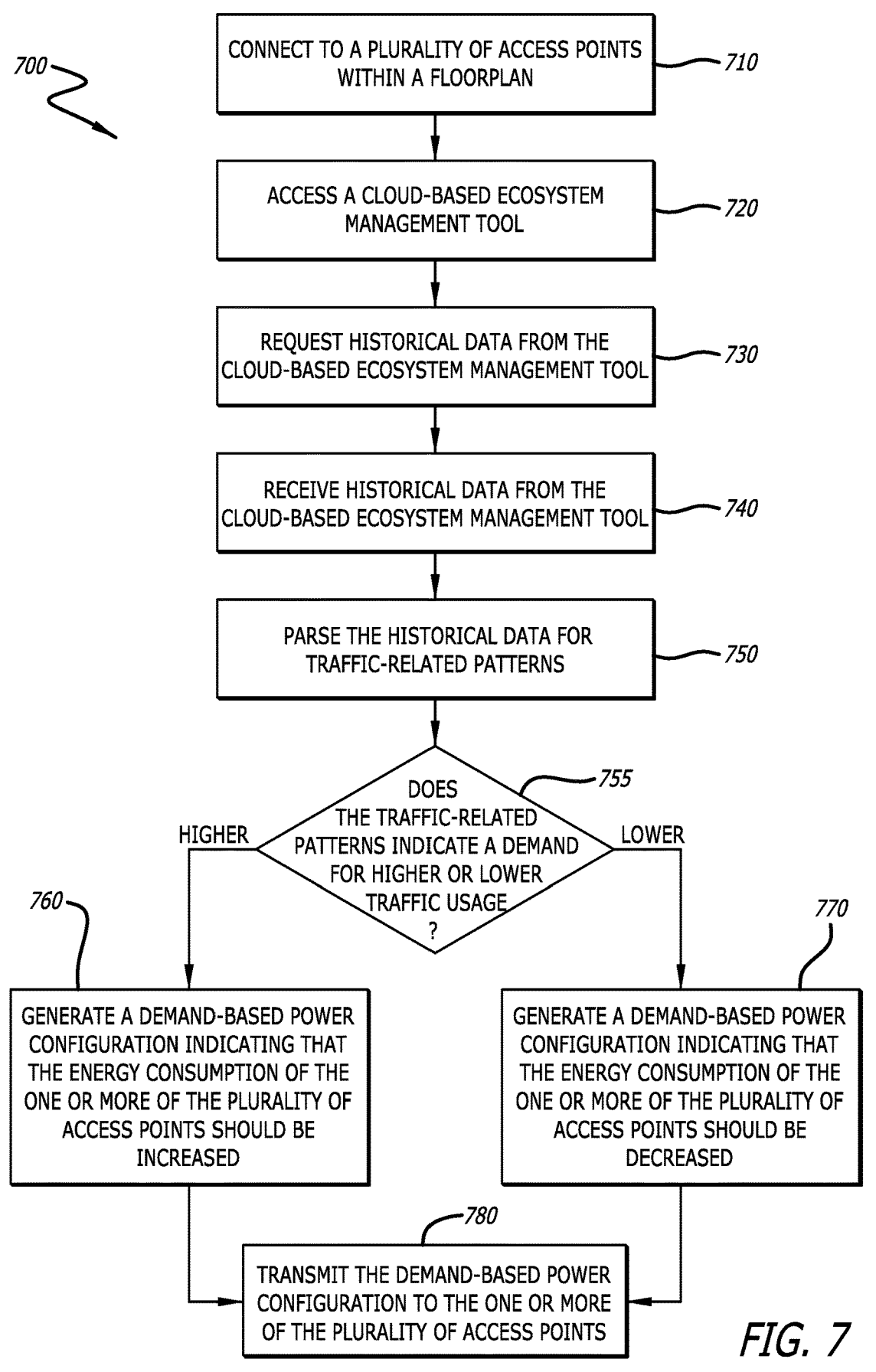

700

CONNECT TO A PLURALITY OF ACCESS POINTS WITHIN A FLOORPLAN 710

ACCESS A CLOUD-BASED ECOSYSTEM MANAGEMENT TOOL 720

REQUEST HISTORICAL DATA FROM THE CLOUD-BASED ECOSYSTEM MANAGEMENT TOOL 730

RECEIVE HISTORICAL DATA FROM THE CLOUD-BASED ECOSYSTEM MANAGEMENT TOOL 740

PARSE THE HISTORICAL DATA FOR TRAFFIC-RELATED PATTERNS 750

DOES THE TRAFFIC-RELATED PATTERNS INDICATE A DEMAND FOR HIGHER OR LOWER TRAFFIC USAGE ? 755

HIGHER

LOWER

760 GENERATE A DEMAND-BASED POWER CONFIGURATION INDICATING THAT THE ENERGY CONSUMPTION OF THE ONE OR MORE OF THE PLURALITY OF ACCESS POINTS SHOULD BE INCREASED

770 GENERATE A DEMAND-BASED POWER CONFIGURATION INDICATING THAT THE ENERGY CONSUMPTION OF THE ONE OR MORE OF THE PLURALITY OF ACCESS POINTS SHOULD BE DECREASED

780 TRANSMIT THE DEMAND-BASED POWER CONFIGURATION TO THE ONE OR MORE OF THE PLURALITY OF ACCESS POINTS

FIG. 7

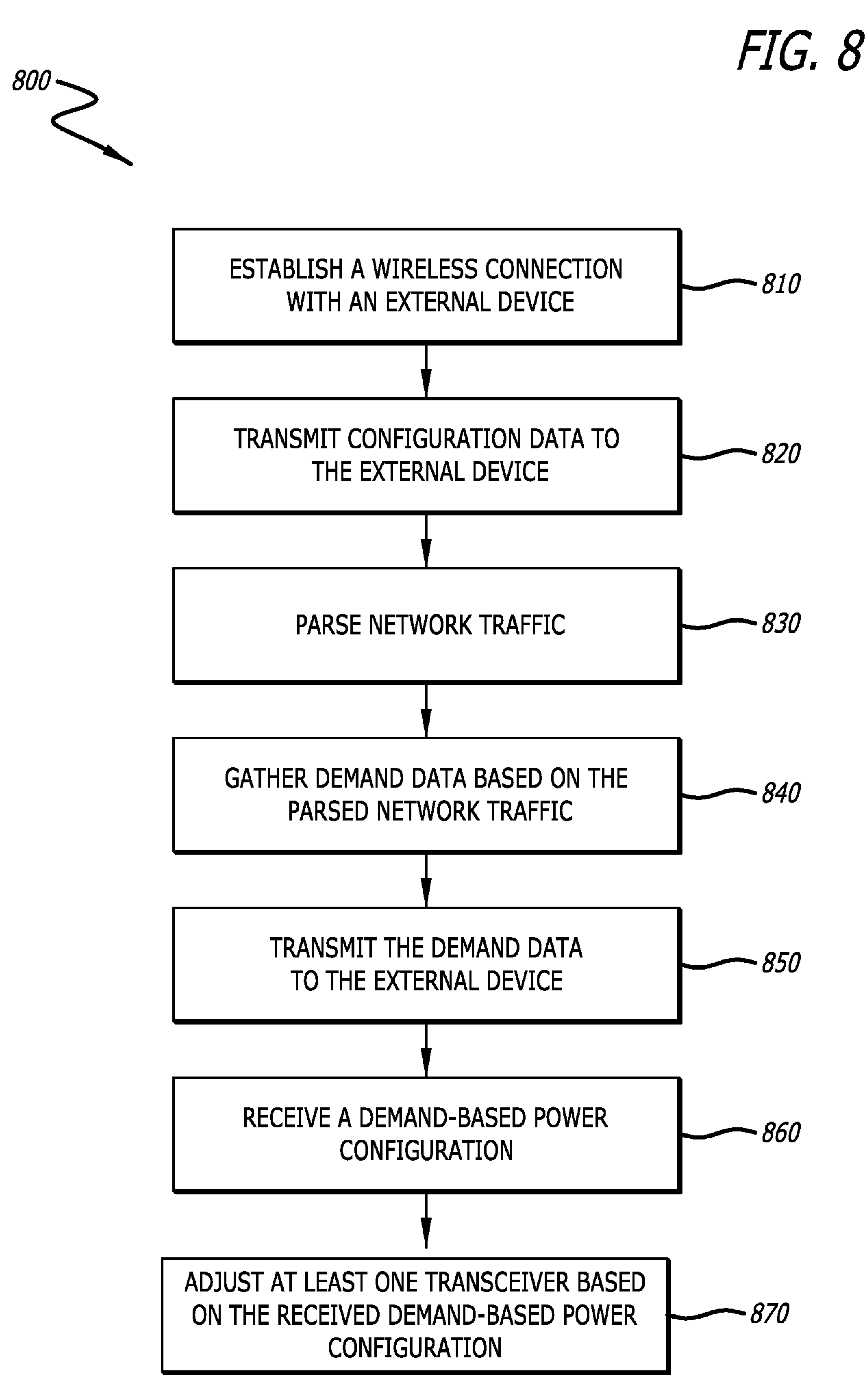
FIG. 8
800
ESTABLISH A WIRELESS CONNECTION WITH AN EXTERNAL DEVICE
810
TRANSMIT CONFIGURATION DATA TO THE EXTERNAL DEVICE
820
PARSE NETWORK TRAFFIC
830
GATHER DEMAND DATA BASED ON THE PARSED NETWORK TRAFFIC
840
TRANSMIT THE DEMAND DATA TO THE EXTERNAL DEVICE
850
RECEIVE A DEMAND-BASED POWER CONFIGURATION
860
ADJUST AT LEAST ONE TRANSCEIVER BASED ON THE RECEIVED DEMAND-BASED POWER CONFIGURATION
870

940
LOCAL AREA NETWORK
900
DEVICE(S)
912
NETWORK INTERFACE CONTROLLER
916
INPUT/OUTPUT CONTROLLER
906
CHIPSET
PROCESSOR(S)
RAM
ROM
STORAGE CONTROLLER
904
908
910
914
918
STORAGE
920
OPERATING SYSTEM
APPLICATIONS
922
924
DEMAND-BASED OPTIMIZATION LOGIC
MACHINE-LEARNING MODEL
926
928
930
932
DEMAND DATA
CONFIGURATION DATA
HISTORICAL DATA
934
ENVIRONMENTAL DATA
902
ENVIRONMENT

PREEMPTIVE RADIO ENERGIZATION BASED ON NETWORK DEMAND

The present disclosure relates to networking. More particularly, the present disclosure relates to utilizing a demand-based optimization logic to adjust an output power of one or more access points based on network-based demand of one or more client devices with respect to a selected floorplan.

BACKGROUND

The dynamic nature of networked environments can pose significant challenges for wireless deployment and optimization. As people and devices move around an environment, the wireless signal strength and quality may change. This can result in poor network performance, dropped connections, and slow data transfer speeds. Furthermore, devices and applications may require different levels of service-level agreements (SLAs), bandwidth, and as the number of devices and applications changes over time, it may be difficult to allocate bandwidth effectively. This can lead to undesirably slow network performance and/or network congestion.

Access points within a wireless network system can have multiple frequency bands of transceivers. Often, these transceivers are in an always on state. However, there are drawbacks to keeping wireless network systems, including access points in an always-on state. Mainly, keeping a wireless network system always on can lead to increased energy costs. Running a wireless network system continuously on all frequency bands can use a lot of energy, so turning off transceivers or access points within the wireless network during non-working hours or other periods of decreased usage can help save on energy consumption.

Additional problems with keeping a wireless networking system always on include providing a larger attack surface for bad actors to exploit, creating interference between other wireless devices, increased maintenance, and upkeep, etc. However, minimum SLAs may be in place and/or user experiences must be maintained if power reduction steps are taken.

SUMMARY

Systems and methods for utilizing a demand-based optimization logic to adjust an output power of one or more access points based on network-based demand of one or more client devices with respect to a selected floorplan in accordance with embodiments of the disclosure are described herein. In some embodiments, the techniques described herein relate to a device, including a processor, a memory communicatively coupled to the processor, and a demand-based optimization logic configured to select a floorplan, and determine a plurality of access points associated with the selected floorplan. The plurality of access points has an output power associated with a signal transmission. The demand-based optimization logic can further identify a plurality of client devices located within the floorplan, assess one or more network-based demands of the client devices, and generate a demand-based power configuration for the floorplan. The demand-based power configuration is configured to adjust the output power of one or more of the plurality of access points and transmit the demand-based power configuration to the plurality of access points.

In some embodiments, the demand-based optimization logic is further configured to establish a communicative connection with the one or more of the plurality of access points.

In some embodiments, the demand-based optimization logic is further configured to request environmental data from the one or more connected access points.

In some embodiments, the demand-based optimization logic is further configured to request configuration data from the one or more connected access points.

In some embodiments, assessing the one or more network-based demands of the client devices includes requesting demand data from the one or more connected access points.

In some embodiments, the demand data is configured to indicate at least one application being used by one or more of the plurality of client devices.

In some embodiments, the at least one application has a known traffic usage pattern.

In some embodiments, the demand-based power configuration is generated based on the known traffic usage pattern of the at least one application.

In some embodiments, the known traffic usage pattern indicates that the output power of one or more of the plurality of access points should be decreased.

In some embodiments, the known traffic usage pattern indicates that the output power of one or more of the plurality of access points should be increased.

In some embodiments, the demand-based optimization logic is further configured to access one or more external devices for data, and generating the demand-based power configuration utilizing the accessed data.

In some embodiments, the data is historical data.

In some embodiments, the historical data includes topological demand history.

In some embodiments, the data is environmental data.

In some embodiments, the one or more external devices is a cloud-based ecosystem management tool.

In some embodiments, the demand-based optimization logic is further configured to request configuration data from the one or more connected access points.

In some embodiments, the generation of the demand-based power configuration utilizes the configuration data of a particular access point to determine one or more available output power adjustment options.

In some embodiments, the techniques described herein relate to a network traffic processing device, including a processor, a memory communicatively coupled to the processor, a lower-power transceiver, a higher-power transceiver, and a demand-based optimization logic configured to establish a wireless connection to an external device and transmit to the external device configuration data associated with the device, and demand data associated with at least one of a plurality of client devices. Finally, the network traffic processing device can receive a demand-based power configuration and adjust the higher-power transceiver based on the demand-based power configuration.

In some embodiments, the techniques described herein relate to a network traffic processing device, wherein the network traffic processing device adjusts the lower-power transceiver based on the demand-based power configuration.

In some embodiments, the techniques described herein relate to a method, including selecting a floorplan for demand-based optimization, determining a plurality of access points associated with the selected floorplan wherein the plurality of access points have an output power associated with a signal transmission, and identifying a plurality of client devices located within the floorplan. Additionally, the method can also include assessing one or more network-based demands of the plurality of client devices, generating a demand-based power configuration for the floorplan, wherein the demand-based power configuration is configured to adjust the output power of one or more of the plurality of access points, and transmitting the demand-based power configuration to the plurality of access points.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a flowchart depicting a process for generating a demand-based power configuration in accordance with various embodiments of the disclosure;

FIG. 7 is a flowchart depicting a process for determining access point power levels based on historical traffic-related patterns in accordance with various embodiments of the disclosure;

FIG. 8 is a flowchart depicting a process for adjusting the power output of a transceiver based on a received demand-based power configuration in accordance with various embodiments of the disclosure.

Figure 1B:
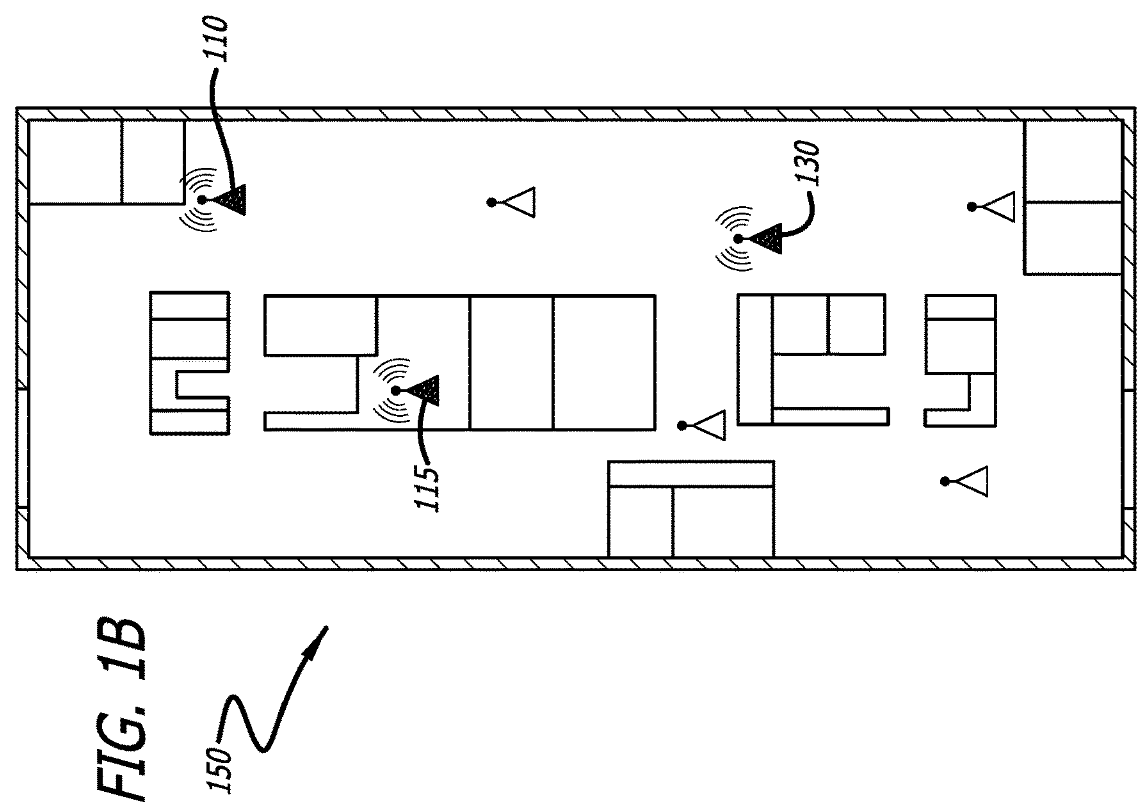
FIG. 1B is a conceptual illustration of a floorplan with a demand-based power configuration applied to the plurality of access points in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that utilize a wireless network to identify and track client-based application demands and various events to generate and apply a demand-based configuration. In many embodiments, a demand-based configuration can be applied to a plurality of devices within a network such that one or more transceivers may be powered down to save energy usage, while still maintaining an acceptable level of service for the client applications still utilizing the network. In some embodiments, entire transport systems within the network may be set to a lower power mode or powered down.

A determination about what devices, transceivers, and/or transport systems can be shut down can be based on a variety of data including currently accessible sustainability-related data, historical data, demand data, and/or environmental data. By accessing these different types of data resources, a demand-based power configuration can be generated, applied, and/or adjusted that reflects the current utilization of the network.

However, various embodiments may also look forward to predicting when an increase in network demand may occur. In this way, one or more network devices can be taken out of a lower-power mode and activated in order to handle the predicted increase in network traffic. These predictions can be based upon various sources, such as, but not limited to, accessing calendar data, looking at historical patterns, examining the movement of people and/or client devices within a network floorplan, etc. As a result, a number of embodiments can reduce the overall power consumption of the network, while maintaining user experiences and avoid violating any service level agreements (SLAs).

In other words, numerous embodiments described herein can be configured to deliver Just-In-Time (JIT) delivery of data to devices. A controller or other networking ecosystem management tool can be configured to predict network usage throughout the day based on historical data. For instance, an ecosystem management tool with access to a client distribution and usage of each of the power consuming interfaces (antenna transceivers, Bluetooth®, etc.) of the AP could apply a power profile most suited to the day. With a machine learning model in place, certain embodiments could be configured to predict the usage throughout the day based on what is observed and tracked within a first morning hour.

Accordingly, it may be further predicted if the day is a holiday or an "all hands" day where a lot of users on-premises.

In further embodiments, this may be done a network-by-network basis such that portions of a network may be set to a lower-power mode or turned off entirely. Likewise, the scope of power management may extend to other transceiver chains to increase power savings. As those skilled in the art will recognize, a transceiver chain can be a set of components or transceivers that are deployed in a specific configuration, such as 1×1, 2×2, 4×4, 8×8, etc. Each may operate independently but may also be grouped together for evaluation with a demand-based power configuration, such that all components within the chain may be powered down. Embodiments described herein may be directed to transceivers, but it is contemplated that these embodiments, processes, devices, and systems can easily be configured to operate in a similar fashion on a different scope of device such as, transceiver chains, and even entire networks or sub-networks.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "high-power transceivers," "power grids," power source," "power consumption," and "lower power usage" when describing energy delivery and utilization, even though those skilled in the art will recognize that those elements are delivering or processing energy (specifically electricity) at a certain rate of power. References to these terms are utilized herein specifically to increase the ease of reading.

In additional embodiments, the access points (APs) may have dual-band/multi-band wake-up radios and a simple 'tone' to detect human presence. Motion sensors can be used as a 'first-level filter' to avoid false positives. Existing systems and devices, such as access control and attendance systems, cameras on video conference systems, and internet protocol (IP) phones can be integrated into the echo system to sense people's presence and movement paths. It is also contemplated that endpoints may be utilized as sensors and that establishing individual identities via reflection profiles computed by APs are also possible. In further embodiments, the endpoints can provide supplementary info, and Wake-On-LAN can be utilized to provide identity continuity when transferring signals along a predicted path of movement of an identity. Additionally, some embodiments may be configured to control lighting and/or HVAC systems based on the tracked movement within the floorplan environment.

Identities and applications can also be determined and maintained through a variety of data. For example, companies have an access control and attendance system. When employees tap their employee cards, the Wi-Fi controller can obtain employee identity-related info, such as seat location, MAC addresses of commonly used devices like cellphones and laptops, so as to easily predict their movement paths inside the company and which corresponding APs should operate. Each of these identities may be associated with various applications or actions that can be utilized to predict and/or understand demands during network usage.

However, utilizing endpoints may not always be optimal. In a number of embodiments, it may be desired to characterize devices in an existing space by policy or in discovery. Often, there may be four types or categories of endpoints: always-on security sensors, sensors with minimal power draw, endpoints that can also function as sensors, and endpoints where power draw is larger than the benefit of sensor usage. In certain embodiments, two profiles may be utilized: one for minimum people/motion-endpoint sensing and the other for optimizing discovery based on expected flow. This approach may leverage existing user context to sense or imply by utilizing available data such as badge-door access or AI camera face detection access. This will help in integrating sensors as much as possible and reducing the need for additional endpoints.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the “C” programming language, scripting programming languages, and/or other similar programming languages. The program code may execute partly or entirely on one or more of a user’s computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to “one embodiment,” “an embodiment,” or similar language means that a particular feature, structure, or characteristic described in connection with the embodiment is included in at least one embodiment of the present disclosure. Thus, appearances of the phrases “in one embodiment,” “in an embodiment,” and similar language throughout this specification may, but do not necessarily, all refer to the same embodiment, but mean “one or more but not all embodiments” unless expressly specified otherwise. The terms “including,” “comprising,” “having,” and variations thereof mean “including but not limited to,” unless expressly specified otherwise. An enumerated listing of items does not imply that any or all of the items are mutually exclusive and/or mutually inclusive, unless expressly specified otherwise. The terms “a,” “an,” and “the” also refer to “one or more” unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms “or” and “and/or” as used herein are to be interpreted as inclusive or meaning any one or any combination. Therefore, “A, B or C” or “A, B and/or C” mean “any of the following: A; B; C; A and B; A and C; B and C; A, B and C.” An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1A:
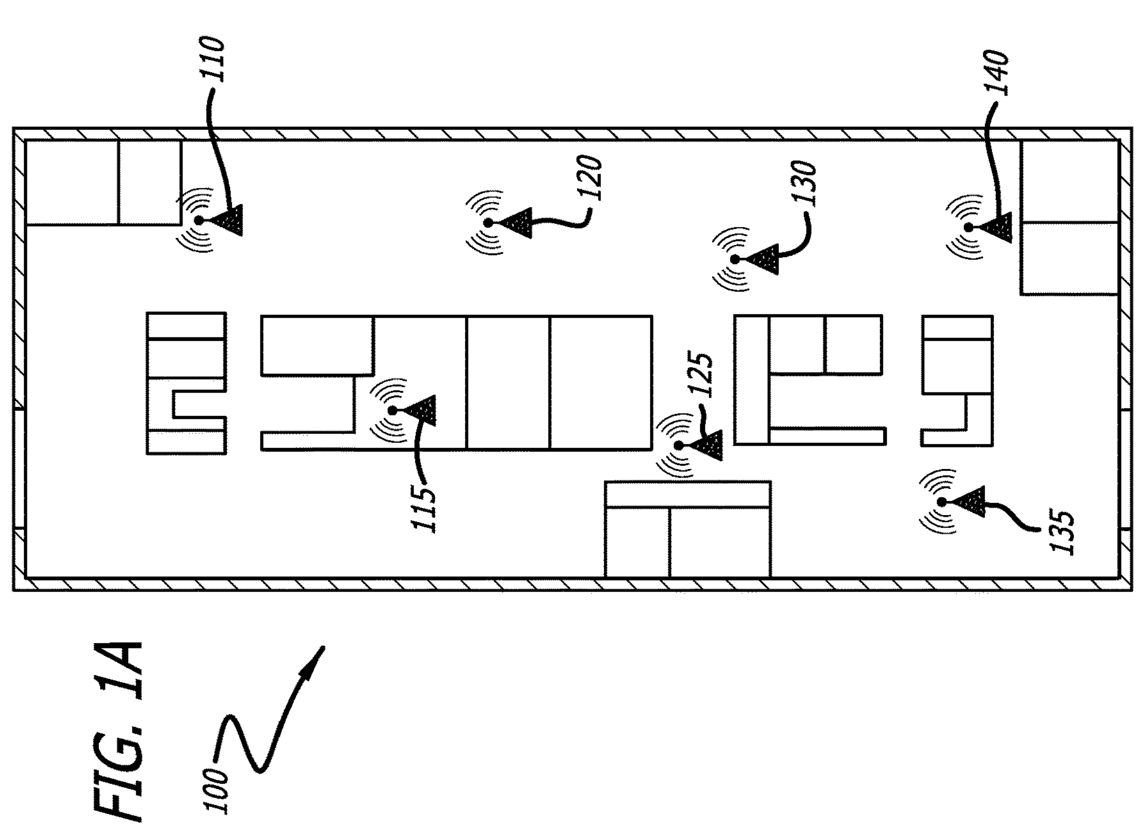
FIG. 1A is a conceptual illustration of a floorplan with a plurality of access points in accordance with various embodiments of the disclosure.

Referring to FIG. 1A, a conceptual illustration of a floorplan with a plurality of access points in accordance with various embodiments of the disclosure is shown. In many embodiments, a floorplan 100 can be configured with different access points to provide wireless network coverage over a large area within the floorplan, if not the entire floorplan. In the embodiment depicted in FIG. 1A, the floorplan 100 has a first access point 110, a second access point 115, a third access point 120, a fourth access point 125, a fifth access point 130, a sixth access point 135, and a seventh access point 140. In some embodiments, including various traditional embodiments, each of these access points can be fully powered on at all times during normal operation. However, during periods of low traffic/bandwidth usage, or when only a few to no people are present within the floorplan 100, this fully powered setup can be inefficient.

Thus, there may be a desire to power down one or more APs and/or transceivers/antennas within the APs. An AP or an ecosystem management tool may be configured to gather relevant data and generate a demand-based power configuration for the floorplan that can be transmitted to all APs associated with the floorplan to achieve a lower-energy-using state. However, based on one or more current or future events or after a predetermined amount of time, a reassessment may occur to determine if the demand-based power configuration for the floorplan needs to be adjusted. In certain embodiments, event-based data may be parsed or otherwise mined to predict when a change in usage may occur, which could trigger a reassessment of the necessary AP power/sustainability settings necessary to provide sufficient coverage to users while minimizing the transceivers and/or APs necessary to provide said coverage.

Referring to FIG. 1B, a conceptual illustration of a floorplan with a demand-based power configuration applied to the plurality of access points in accordance with various embodiments of the disclosure is shown. In many embodiments, the floorplan 150 depicted in FIG. 1B is similar to the floorplan 100 of FIG. 1A but has a demand-based power configuration applied. This demand-based power configuration in FIG. 1B results in the first access point 110, second access point 115, and fifth access point 130 remaining active while the remaining APs are powered down.

In some embodiments, the demand-based power configuration can be designed to provide coverage over a majority of the floorplan 150. Thus, the selection of active APs can be spread out of the floorplan 150. In this configuration, a user with a client device may still be able to connect to the wireless network at most any location within the floorplan 150. However, since there is a reduced traffic usage because of the low number of users, the lower number of access points can be sufficient to achieve proper SLA levels or user experience needs.

As described above, an AP may be selected to remain powered on, or to have at least a lower-power transceiver active near an entrance to the area of the floorplan 150. For example, the second access point 115 may be deployed near an elevator bay which may allow for new people to enter the area. Thus, when a sufficient amount of new users is detected in the area and/or a certain amount of network traffic is being utilized, the demand-based power configuration may be updated to power on one or more additional APs. Predicted motion may be utilized, such as matching up a device being used by an individual identity being tracked with a workstation in a known location within the floorplan 150, to power an APs along the way sufficient to maintain SLA levels and/or user experiences.

Although specific embodiments are described above with respect to FIGS. 1A and 1B, any of a variety of systems and/or processes may be utilized in accordance with embodiments of the disclosure. For example, the access points may be directed to turn on in response to an upcoming event such as a meeting where an increase in network traffic is expected. The aspects described in FIGS. 1A and 1B may also be interchangeable with other elements of FIGS. 2-9 as required to realize a particularly desired embodiment. Embodiments that are directed to only turn off one or more transceivers associated with higher-power frequency bands are discussed below.

Figures 2A, 2B:
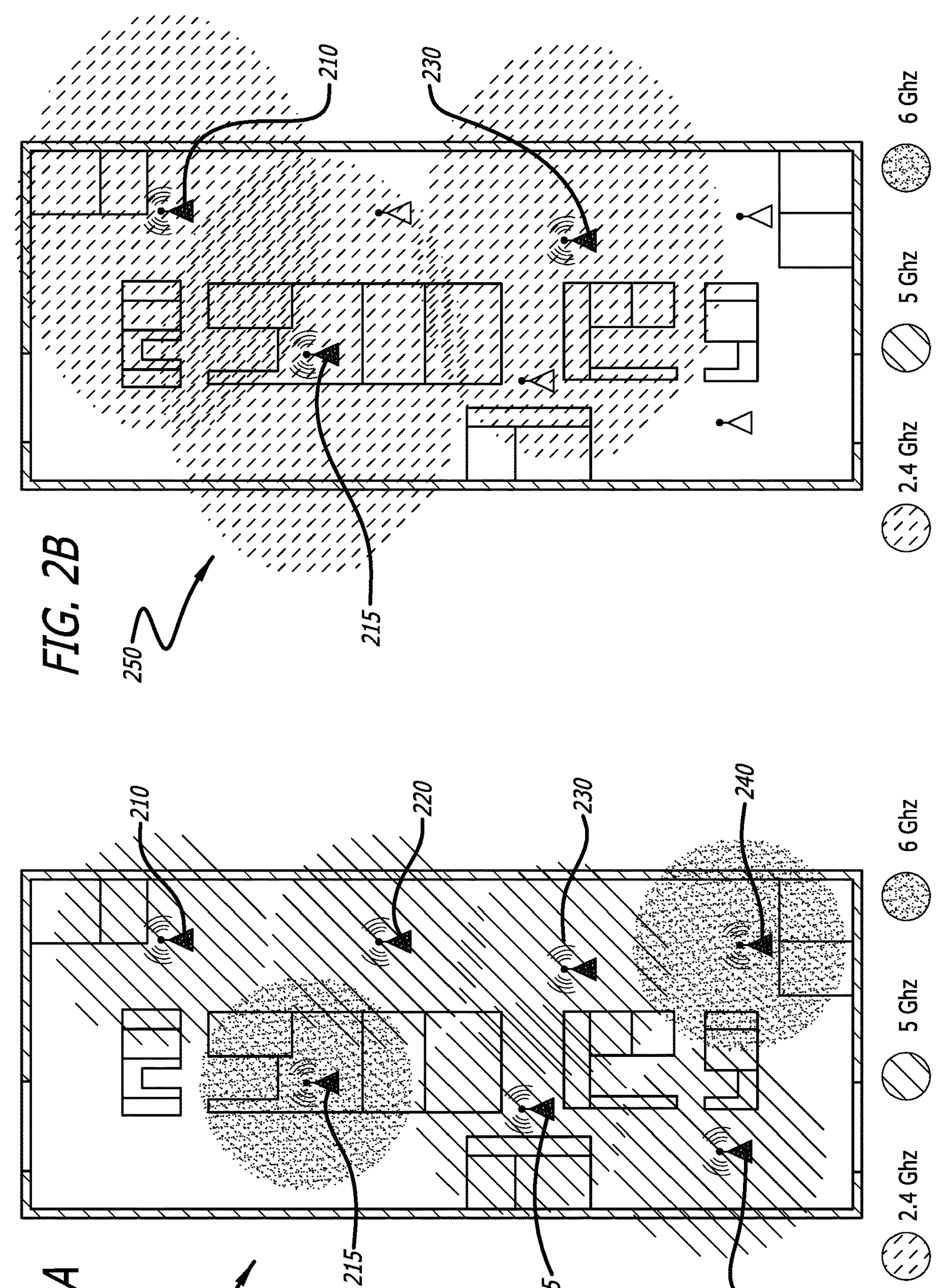
FIG. 2A is a conceptual illustration of a floorplan with a plurality of access points transmitting at a variety of frequencies in accordance with various embodiments of the disclosure.
FIG. 2B is a conceptual illustration of a floorplan with a demand-based power configuration applied to the plurality of access points to minimize transceiver usage in accordance with various embodiments of the disclosure.

Referring to FIG. 2A, a conceptual illustration of a floorplan 200 with a plurality of access points transmitting at a variety of frequencies in accordance with various embodiments of the disclosure is shown. Similar to the embodiments depicted in FIG. 1A, a floorplan 200 can be configured with different access points to provide wireless network coverage over a large area within the floorplan. In additional embodiments, those APs may be further configured to provide network coverage at various frequency bands. These frequency bands can often be generated by utilizing a specialized transceiver that is configured to transmit and/or receive wireless network signals at a particular frequency band. In various embodiments, the frequency bands may include 2.4 GHz, 5 GHZ, and/or 6 GHz signals. However, it is contemplated that any frequency band may be utilized as necessary to allow for the transmission of wireless networking signals.

In the embodiment depicted in FIG. 2A, the floorplan 200 is configured with a first access point 210, a second access point 215, a third access point 220, a fourth access point 225, a fifth access point 230, a sixth access point 235, and a seventh access point 240. In the depicted embodiment, the first access point 210, third access point 220, fourth access point 225, fifth access point 230 and sixth access point 235 are each transmitting a 5 GHz wireless signal. Additionally, the second access point 215 and seventh access point 240 are transmitting wireless signals at a 6 GHz frequency band. However, during periods of low traffic/bandwidth usage, or when only a few to no people are present within the floorplan 200, this configuration may be inefficient.

Thus, there may be a desire to power down not only one or more APs within the floorplan 200, but to also power down one or more transceivers/antennas configured with different frequency bands. Similar to the embodiments described above with respect to FIGS. 1A and 1B, an AP or an ecosystem management tool may be configured to gather relevant data and generate a demand-based power configuration for the floorplan that can be transmitted to all APs associated with the floorplan to achieve a lower-energy-using state. However, based on one or more current or future events or after a predetermined amount of time, a reassessment may occur to determine if the demand-based power configuration for the floorplan needs to be adjusted. In certain embodiments, event-based data may be parsed or otherwise mined to predict when a change in usage may occur, which could trigger a reassessment of the necessary AP power/sustainability settings necessary to provide sufficient coverage to users while minimizing the transceivers and/or APs necessary to provide said coverage, including powering on one or more frequency band transceivers within one or more APs.

Referring to FIG. 2B, a conceptual illustration of a floorplan 250 with a demand-based power configuration applied to the plurality of access points to minimize transceiver usage in accordance with various embodiments of the disclosure is shown. In many embodiments, the floorplan 250 depicted in FIG. 2B is similar to the floorplan 200 of FIG. 2A but has a demand-based power configuration applied. This demand-based power configuration in FIG. 2B results in the first access point 210, second access point 215, and fifth access point 230 remaining active while the remaining APs are powered down.

Additionally, within the first access point 210, second access point 215, and fifth access point 230, the respective 5 GHz and 6 GHz transceivers have been powered down. As a result, only the 2.4 GHz transceivers are active within the embodiment of FIG. 2B. In these embodiments, the demand-based power configuration can be designed to provide coverage over a majority of the floorplan 250 with just the 2.4 GHz signal. Thus, the selection of active APs can be spread out of the floorplan 250. In this configuration, a user with a client device may still be able to connect to the wireless network at most any location within the floorplan 250. However, if it is detected that more users may be predicted to enter the floorplan 250 or that an application on a client device may require increased bandwidth, additional frequency bands or APs may be powered on to continue providing a sufficient user experience.

Although specific embodiments are described above with respect to FIGS. 2A and 2B, any of a variety of systems and/or processes may be utilized in accordance with embodiments of the disclosure. For example, the access points may be directed to turn on in response to a predefined schedule or when historical patterns indicate that increased usage is likely to occur. The aspects described in FIGS. 2A and 2B may also be interchangeable with other elements of FIGS. 1A-1B, and 3-9 as required to realize a particularly desired embodiment. Embodiments that reconfigure APs in response to predicted or determined events are described below.

Figure 3A:
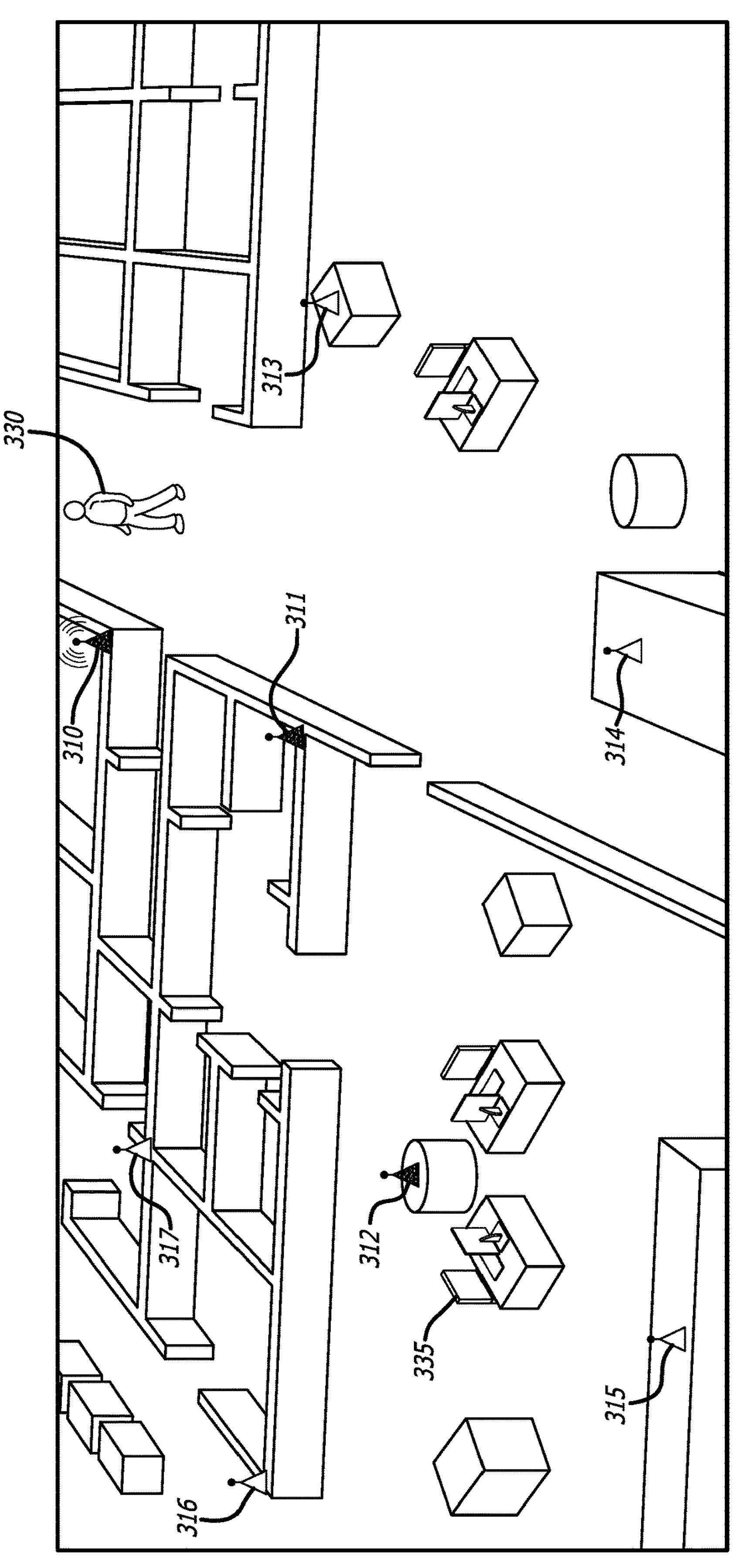
FIG. 3A is a conceptual illustration of an office floorplan with a demand-based power configuration applied to a plurality of access points in accordance with various embodiments of the disclosure.

Referring to FIG. 3A, a conceptual illustration of an office floorplan with a demand-based power configuration applied to a plurality of access points in accordance with various embodiments of the disclosure is shown. In many embodiments, a floorplan may be configured with APs, such as in an office environment. These environments may have low usage hours, such as at night or on the weekends. During these times, a demand-based power configuration may be applied such that only a minimal amount of APs are powered on. In some embodiments, when no people are detected within the floorplan area, only APs by entrances may be powered on.

In the embodiment depicted in FIG. 3A, a floorplan has a first access point 310 that is by the entrance to the floorplan. This can be similar to the floorplan depicted in FIG. 3B. In the FIG. 3A embodiment, a person 330 has entered the floorplan area. The first access point 310 has been configured to detect the person 330 through a transceiver or other means. The AP or an ecosystem management tool that is configured to generate and/or update demand-based power configurations may be able to identify the person 330. In certain embodiments, the person 330 may have a mobile phone that is connected to the first access point 310 through a wireless communication protocol. The first access point 310 may be able to match the device with the person 330 through previously stored data or other means.

Upon matching the detected motion with the person 330, the first access point 310 can determine if relevant future events may occur. By way of non-limiting example, the person 330 may have a virtual meeting that is scheduled to occur shortly. The access point or ecosystem management tool may have data that indicates that the person 330 is associated with a workstation 335. Therefore, the first access point 310 or ecosystem management tool may determine that the person 330 is likely to go to their workstation 335 within the floorplan area. As a result, the first access point 310, ecosystem management tool, or other device configured to generate and/or update demand-based power configurations may direct the second access point 311 to power on to make sure the next area the person 330 will walk through has wireless signal coverage.

Subsequently, the first access point 310, ecosystem management tool, or other device configured to generate and/or update demand-based power configurations may direct the third access point 312 to power on in order to provide wireless network coverage in the area of the workstation 335 the person 330 is most likely to walk toward. The remaining access points, such as the fourth access point 313A, fifth access point 314, sixth access point 315, seventh access point 316, and eighth access point 317 are all directed to remain powered down during this movement of the person 330. In this respect, the access points within the floorplan are reacting and adjusting power settings to direct events as they occur or with limited foresight related to the current event being reacted to. However, additional events in the future can indicate an adjustment to the demand-based power configurations associated with the floor plan is needed, as discussed below.

Figure 3B:
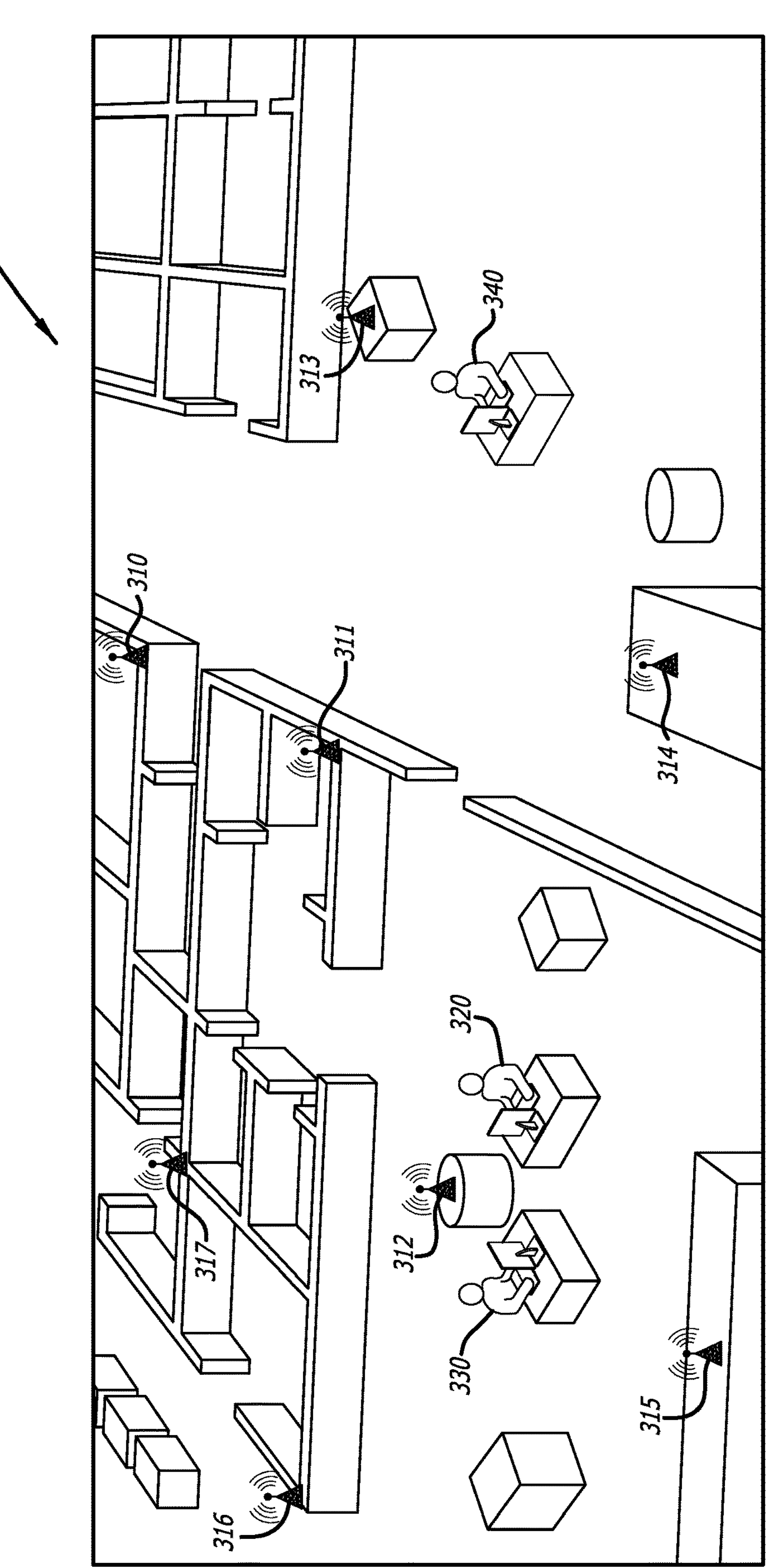
FIG. 3B is a conceptual illustration of an office floorplan with a demand-based power configuration applied to the plurality of access points in anticipation of an upcoming meeting in accordance with various embodiments of the disclosure.

Referring to FIG. 3B, a conceptual illustration of a floorplan 300 with a plurality of access points in accordance with various embodiments of the disclosure is shown. In many embodiments, a floorplan 300 can be selected for parsing and determined upcoming events that can indicate a change in a demand-based power configuration is required to maintain a user experience with the wireless network. Although the floorplan 300 depicted in the embodiment of FIG. 3 is an office environment, it is contemplated that a floorplan may be any environment that includes a plurality of access points distributed throughout an area. In additional embodiments, an area may have multiple floorplans and access points may be associated with multiple floorplans. Indeed, in certain embodiments, a floorplan may be defined as a collection of access points and the area that those access points cover.

In the embodiment depicted in FIG. 3B, the floorplan 300 has a first access point 310 at an entranceway to the area. Likewise, a second access point 311 can be placed centrally within the floorplan 300. Within the floorplan 300, three people are depicted working at desk workstations. The second person 320 and person 330 are working next to a third access point 312. A third person 340 is working next to a fourth access point 313. Additional access points are distributed throughout the floorplan 300 to provide additional wireless signal coverage including a fifth access point 314, a sixth access point 315. Finally, a seventh access point 316 and an eighth access point 317 are configured to provide wireless network coverage to an area including a meeting room.

As discussed above, traditional deployments may have all access points fully powered and operating throughout the day. However, a demand-based power configuration may determine that the second person 320 and person 330 may be fully served by the third access point 312 while the third person 340 may be fully served by the connection provided by the fourth access point 313. Therefore, based on the current data, a demand-based power configuration may be configured to select a number of access points that can be selectively powered down or de-energized. This powering down may include powering down the entire unit to a sleep mode but may also include powering down one or more transceivers within the access point. As described above, in a number of embodiments, the access points can be configured with multiple transceivers that are configured for different frequency bands of usage.

However, other data may be received and parsed by the AP, ecosystem management tool, or other device that is configured to generate and/or update demand-based power configurations which may indicate that additional APs and/or frequency band transceivers may be required to meet upcoming demand. By way of non-limiting example, the floorplan 300 may be an office floorplan that has a plurality of access points managed by an ecosystem management tool which can generate and/or apply a demand-based power configuration to the APs to power them up or down as well as turn various frequency band transceivers on or off. In this example, the ecosystem management tool may also have access to various data sources such as calendaring data associated with the workers within the organization and/or floorplan 300.

This calendaring data can be accessed to determine that a virtual conference meeting is scheduled to be held in the large meeting room within the floorplan 300 in the near future. Based on this, it can be determined that there is likely to be a large influx of network connection demand as a large number of workers will be travelling to the large meeting room and utilizing a number of devices that may require a large throughput of data in the form of live audio and video feeds. As a result of the above example, the embodiment depicted in FIG. 3B can activate the various APs to provide sufficient network connection coverage to not only the large meeting room, but also to the various spaces within the floorplan that people may traverse to arrive at the meeting room. In this way, various embodiments of the disclosure can power up and power down APs as needed to provide a sufficient user experience for whomever may enter the floorplan 300.

Powering down access points and/or their transceivers can provide significant savings in overall electricity usage within the floorplan 300. However, powering down these elements within a network can cause problems when additional traffic suddenly enters the floorplan 300. For example, additional people may walk into the floorplan 300 from an outside area. If the first access point 310 was powered down into a sleep mode, there may be situations where the time it takes to wake from the sleep mode is too long to provide adequate coverage and/or service to the additional people. This can negatively affect service level agreements (SLAs) as well as the overall user experience. Thus, in a variety of embodiments, any powering down within the floorplan 300 should be weighed against the time it may take to sufficiently satisfy a sudden increase in network traffic.

Although a specific embodiment is described above with respect to FIGS. 3A and 3B, any of a variety of systems and/or processes may be utilized in accordance with embodiments of the disclosure. For example, the updating of the demand-based power configuration may occur during regular intervals, such as, but not limited to, every few minutes. The aspects described in FIGS. 3A and 3B may also be interchangeable with other elements of FIGS. 3A-2B, and 4-9 as required to realize a particularly desired embodiment. Flowcharts describing these processes in more detail are described below.

Referring to FIG. 4, a flowchart depicting a process 400 for generating and transmitting demand-based power configurations in accordance with various embodiments of the disclosure is shown. In many embodiments, the process 400 can select a floorplan, such as a floorplan in an environment (block 410). The selected floorplan may be a blueprint or layout of the building that highlights various dimensions, sections or aspects of a building or environment, without limitation. The floorplan may be any area that has a deployed array or plurality of APs. Once the floorplan is selected, block 420 involves connecting to a plurality of APs associated with the selected floorplan. The plurality of APs may include any number of network devices that provide wireless connectivity across the selected floorplan. Indeed, various embodiments of the process 400 can determine a plurality of client devices associated with the selected floorplan (block 430). It is contemplated that an AP may be associated with multiple floorplans and that decisions may be generated for that AP when processing each of the associated and/or selected floorplans. Block 440 involves assessing the network-based demands of the client devices, which could include factors such as the number of devices, the amount of data being transferred, and the type of applications being used. Those skilled in the art will appreciate that network-based demands may be assessed alone or in combination, and without limitation with respect to other similar factors.

Based on the assessed network-based demands, the process 400 may generate a demand-based power configuration (block 450). The demand-based power configuration may involve generating a demand-based power configuration for the plurality of APs. This configuration may desirably adjust the output power of one or more of the APs through one or more options to meet the needs of the client devices. Finally, in step 460, the generated demand-based power configuration is transmitted to the plurality of access points to optimize network performance and ensure that client devices have the desired connectivity. In further embodiments, that demand-based power configuration may be transmitted to the plurality of APs associated with the selected floorplan. However, in certain embodiments, the AP itself may generate a demand-based power configuration and utilize it without the need to receive a demand-based power configuration from an external source.

Although a specific embodiment for a process 400 to generate and/or transmit demand-based power configurations to APs is described above with respect to FIG. 4, any of a variety of systems and/or processes may be utilized in accordance with embodiments of the disclosure. For example, the process 400 may generate the demand-based power configuration in response to one or more heuristic rules, or may, in additional embodiments, utilize one or more machine learning methods. The aspects described in FIG. 4 may also be interchangeable with other elements of FIGS. 1-3, and 5-9 as required to realize a particularly desired embodiment. A more detailed method for generating and updating a demand-based power configuration for APs is described below.

Figure 5:
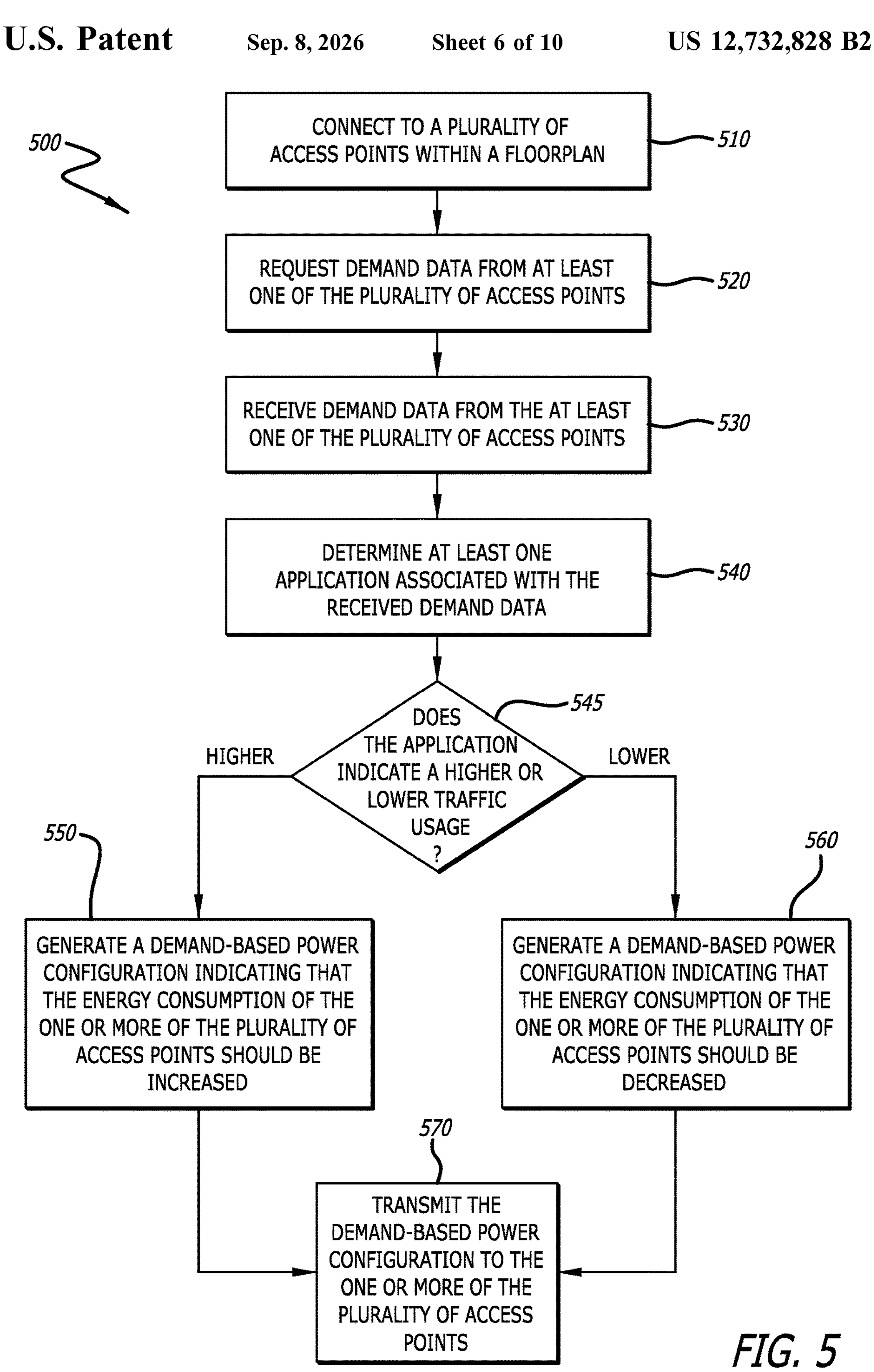
FIG. 5 is a flowchart depicting a process for determining traffic-related demand of one or more applications in accordance with various embodiments of the disclosure.

Referring to FIG. 5, a flowchart depicting a process 500 for determining traffic-related demand of one or more applications in accordance with various embodiments of the disclosure is shown. Those skilled in the art will appreciate that certain applications may have higher traffic requirements as compared to another applications. For example, certain video conferencing applications may require more traffic than an email application because video conferencing typically involves real-time transmission of audio and video data between two or more devices. This real-time data transmission requires a significant amount of bandwidth and a low-latency network to ensure that the audio and video streams are synchronized and provide a high-quality experience for the participants. On the other hand, typical email applications involve the transfer of relatively small amounts of data between a client device and a mail server. The amount of data transferred is generally limited to the size of the email message and any attached files. Consequently, as compared to video conferencing applications, certain email applications may require much less bandwidth and lower network latency. To that end, the process 500 involves connecting to a plurality of APs within a floorplan (block 510). Once connected, demand data is requested from at least one of the APs (block 520). The demand data is received from the APs at block 530.

At block 540, a determination is made with respect to at least one application associated with the received demand data. It should be appreciated that several characteristics of an application could require more traffic on a network. For example, one of the most significant factors is the amount of data that needs to be transferred between various client and server devices. Applications that involve transferring large amounts of data, such as video streaming, online gaming, or file sharing, generally require more traffic than applications that transfer smaller amounts of data, such as email or web browsing. Similarly, certain applications that require frequent updates or real-time data, such as stock trading or online chat, require more traffic than applications that transfer data less frequently. In addition, the type of data being transferred can also affect the amount of traffic required. For example, high-quality video or audio data requires more traffic than low-quality data. Similarly, interactive applications, such as online gaming or virtual reality, require low latency and high bandwidth connections to ensure a smooth user experience, which can result in more traffic on the network.

Based on one or more of the application's characteristics, a determination is made to whether the application indicates a higher or lower traffic usage (block 545). If the application indicates higher traffic usage, the process goes to block 550 and generates a demand-based power configuration that indicates that the output power of one or more of the APs should be increased. Conversely, if the application indicates lower traffic usage, the system goes to block 560 and generates a demand-based power configuration that indicates that the output power of one or more of the APs should be decreased.

At block 570, the demand-based power configuration is transmitted to one or more of the APs. This configuration ensures that the APs are providing the appropriate level of power to optimize network performance based on the applications being used. As discussed above, the demand-based power configuration may include directives to power down an AP, to power down one or more bands of antennas within an AP, to select one or more power-saving configurations, or actions to take that could increase sustainability metrics. In a number of embodiments, the process 500 can power down a higher-power transceiver based on the received reduced power configuration. For example, a 5 GHz transceiver may use more electricity than a 2.4 GHz transceiver. If the 5 GHz transceiver is not directly needed to sustain the SLA or other user experience, it may be powered down to save electricity.

Figure 6:
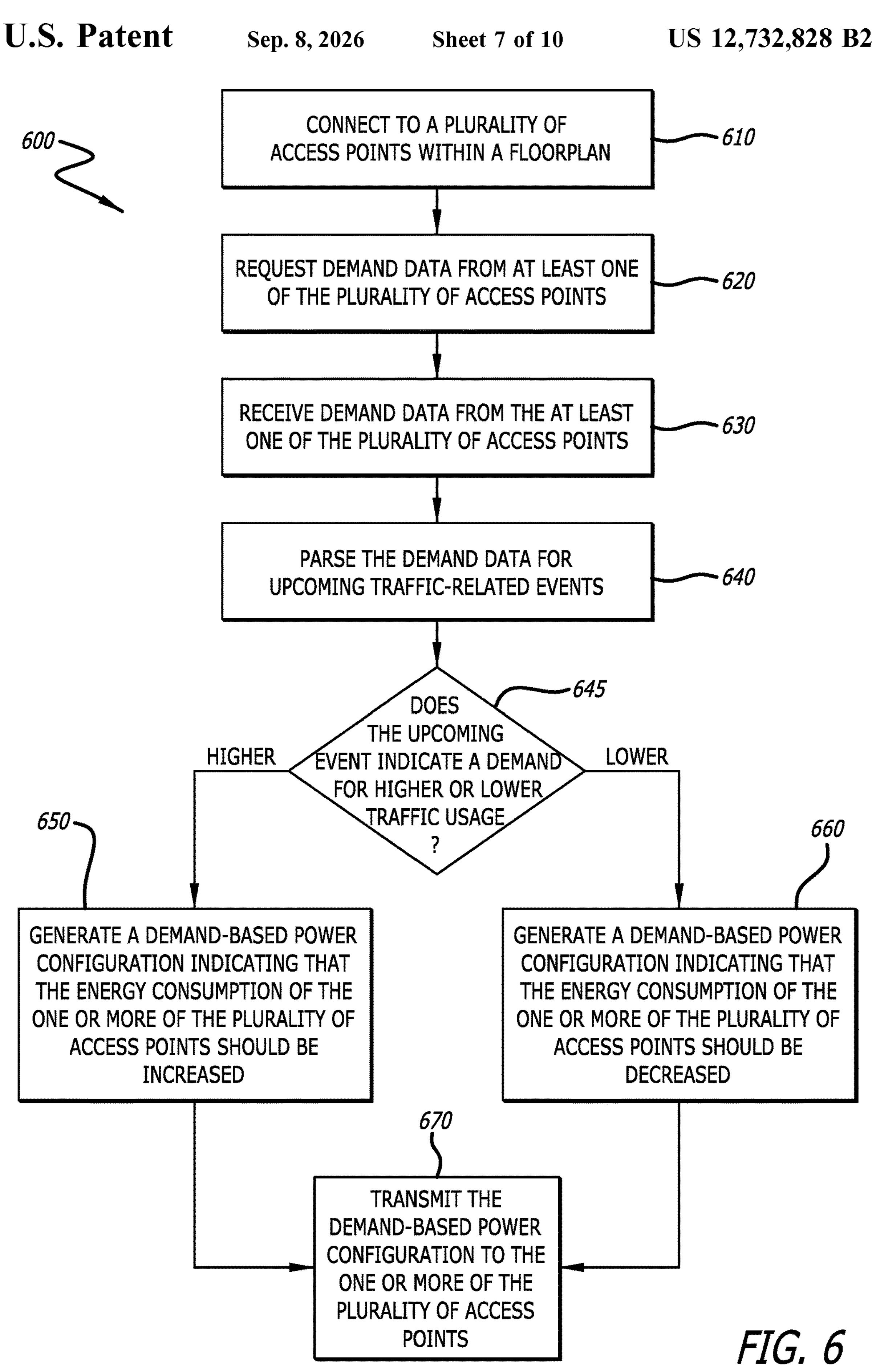
FIG. 6 is a flowchart depicting a process for determining demand requirements for upcoming traffic-related events in accordance with various embodiments of the disclosure.

Referring to FIG. 6, a flowchart depicting a process 600 a process for determining demand requirements for upcoming and/or scheduled events that may impact traffic-demand in accordance with various embodiments of the disclosure is shown. It will be appreciated that certain events or time periods may require higher bandwidth and traffic, such as a scheduled video conference, large file transfer, streaming concert, or online gaming tournament, may require more traffic on a network as they require a significant amount of data to be transmitted over the network in a short and/or known time period. For example, a video conference may require significant bandwidth to transmit audio and video in real-time and at a high resolution. Similarly, scheduled file transfers or backups may require high bandwidth to transfer the files quickly. On the other hand, certain events, or time periods, such as holidays, a scheduled email backup or an idle period, may require less traffic on a network. During such times, the network can optimize its performance by reducing the output power of access points, which reduces interference and energy/power consumption. By identifying and analyzing these upcoming events, a network can adjust its power configuration to ensure optimal performance and reduce congestion on the network.

To that end, process 600 involves connecting to a plurality of APs within a floorplan (block 610). In block 620, demand data is requested from at least one of the APs, which is received in block 630. The demand data is parsed in block 640 to identify upcoming traffic-related events. The traffic-related events may also implicate specific time periods during which network traffic is high, such as during business hours when many employees are using their computers simultaneously. This increased traffic may result in slower network speeds and reduced performance. Conversely, there may be time periods during which less traffic is required, such as after business hours or during periods of low activity. In these instances, the network may be able to reduce its output power to reduce energy consumption and interference. In block 645, the upcoming events and/or time periods may be analyzed to determine whether there will be higher or lower traffic usage. If the upcoming event indicates higher traffic usage, a demand-based power configuration is generated to indicate that the output power of one or more of the APs should be increased (block 650). Conversely, if the upcoming event indicates lower traffic usage (block 660), a demand-based power configuration is generated that indicates that the output power of one or more of the Aps should be decreased. Finally, in block 670, the demand-based power configuration is transmitted to the one or more APs to optimize the network performance based on upcoming traffic-related events.

It should be appreciated that power consumption may vary between clients in a wireless network, power usage may be optimized based on client behavior and hardware design. For example, certain clients and/or corresponding devices may be more "chatty" than others, meaning they generate more network traffic and thus, consume more power. To address this, these clients may be migrated in some embodiments to a lower power frequency band such as 2.4 GHz, 5 GHZ, or 6 GHz, by way of non-limiting example. In addition to client behavior, power consumption may also vary depending on the specific chip and FEM (front-end module) design used in a wireless device. Generally speaking, low-frequency radios consume less power and can propagate longer distances than high-frequency radios. However, higher frequency bands like 5G and 6G may provide wider bandwidths and higher throughput.

Therefore, to optimize power usage, it may be beneficial in some embodiments to assign more chatty but lower throughput clients to the 2.4 GHz radio, while assigning higher throughput clients to higher frequency radios. This can help to balance power consumption across the network while still providing adequate bandwidth and performance for each client. To that end, a consideration of client behavior, hardware design, and power consumption in a wireless network may be optimized for maximum efficiency and performance.

Referring to FIG. 7, a flowchart depicting a process for determining AP power levels based on historical traffic-related patterns in accordance with various embodiments of the disclosure is shown. It is envisioned that historical data may be analyzed across multiple planes or domains. These domains may include geographical/topological history, temporal data, daily seasonality, and quarterly/yearly seasonality, by way of non-limiting example. Geographical/topological history may include analyzing data on the usage and power efficiency of the network across different locations or topologies. This may be visualized as a heatmap showing areas of high and low network utilization and power efficiency. Similarly, temporal data may refer to analyzing network usage patterns over time, such as the number of users accessing the network during different times of day or days of the week. This may be useful in identifying trends and patterns that can inform network optimization strategies. Daily seasonality may include analyzing network usage patterns on a daily basis, such as peak usage times or during periods of low network activity.

Similarly, quarterly/yearly seasonality involves analyzing network usage patterns over longer periods of time, such as the number of users accessing the network during certain times of the year or during specific events. In embodiments, by combining data across these different planes or domains, a single topological node may be configured to determine network usage over time. It is envisioned that this node may be used to inform network optimization strategies such as adjusting the output power of APs or routing network traffic more efficiently.

To that end, the process 700 begins by connecting to one or more APs within the floorplan (block 710) and then accesses a cloud-based ecosystem management tool (block 720). Historical network usage or traffic-related pattern information is requested from or via the tool (block 730) and received at block 740. It should be appreciated that AP power levels may be determined based on historical traffic-related patterns by analyzing data from the network over time. This data may be used to identify patterns of network usage and to determine the average levels of network traffic during specific time periods. For example, if data shows that network traffic is consistently high during business hours, the AP power levels could be set higher during those periods to ensure that users have access to a strong and stable connection. Conversely, during periods of low activity, the AP power levels could be reduced to conserve energy and reduce interference.

The historical data is then parsed for traffic-related patterns (block 750). The traffic patterns may be evaluated to determine if demand for higher or lower traffic usage is indicated (block 755). If the indicated demand is "higher," a demand-based power configuration is generated, indicating that the output power of the access points should be increased (block 760), and if the indicated demand is "lower," a demand-based power configuration is generated, indicating that the output power of the access points should be decreased (block 770). Finally, the demand-based power configuration is transmitted to the APs (block 780).

Referring to FIG. 8, a flowchart depicting a process for adjusting the power output of a transceiver based on a received demand-based power configuration in accordance with various embodiments of the disclosure is shown. The process 800 aims to optimize the power consumption of a wireless network based on a demand-based power configuration. A wireless connection is established with an external device (block 810) and transmitting configuration data to it (block 820). It is envisioned that block 830, which parses network traffic, could involve analyzing the type of data being transmitted, such as voice or video data, and the data packet size. The demand data gathered in block 840 could be based on the traffic analysis and could include information on the number of active nodes, data transfer rates, and latency The demand data could then be transmitted back to the external device at block 850, which could be used to make decisions on power optimization based on the network demand. For example, the external device could decide to reduce the power consumption of certain transceivers that are not actively used or to reduce the transmission rates during periods of low network activity. In block 860, the external device could send a demand-based power configuration to the wireless network. This configuration could specify power usage settings for the transceivers based on the demand data received earlier. Finally, in block 870, the output power of at least one transceiver could be adjusted based on the received demand-based power configuration. This adjustment could involve reducing the output power of certain transceivers or turning off certain transceivers during periods of low network activity to optimize power consumption.

Figure 9:
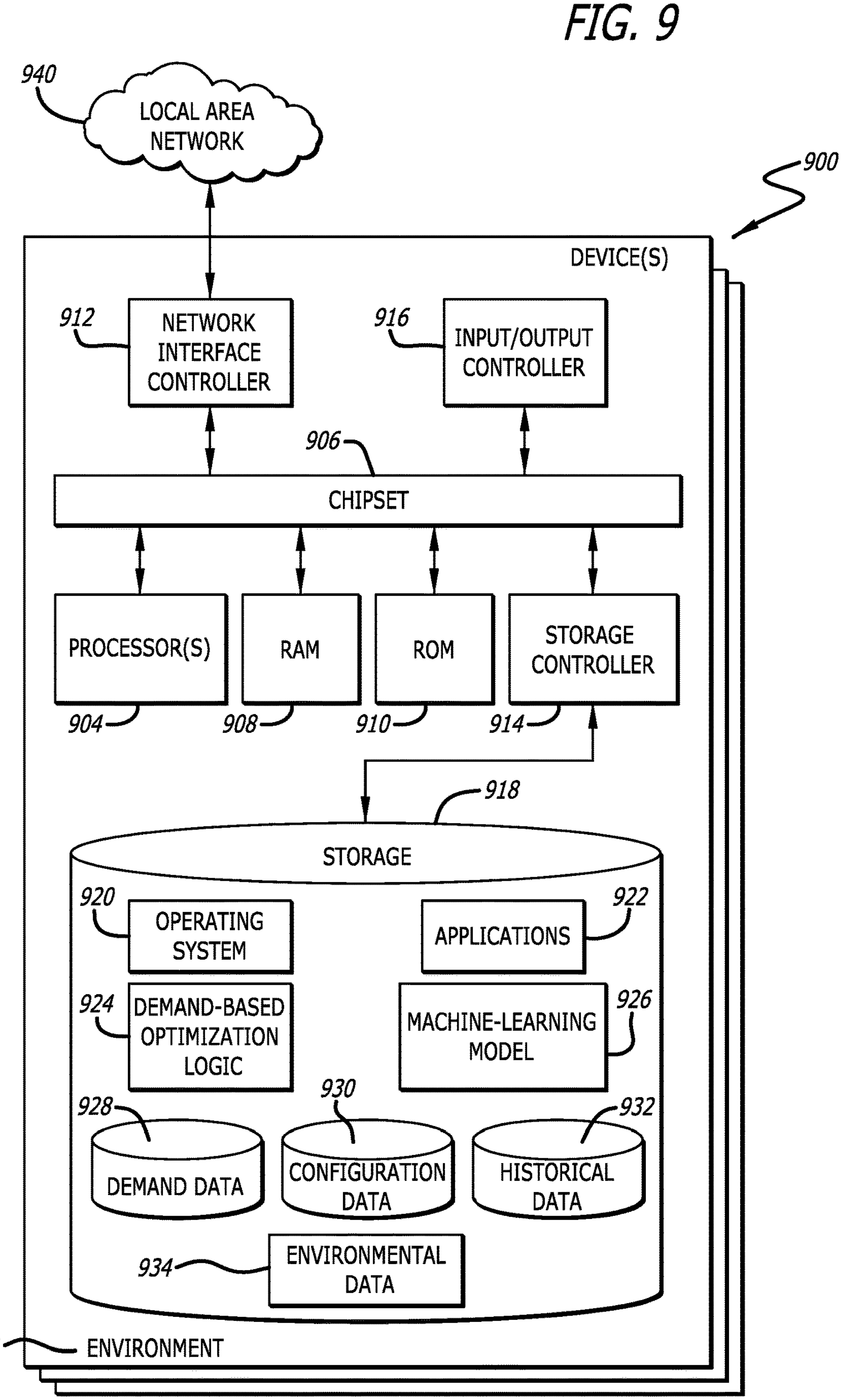
FIG. 9 is a conceptual block diagram of a device suitable for use in a minimally selective frequency energization system in accordance with various embodiments of the disclosure.

Referring to FIG. 9, a conceptual block diagram of a device 900 suitable for use in a minimally selective frequency energization system in accordance with various embodiments of the disclosure is shown. The embodiment of the conceptual block diagram depicted in FIG. 9 can illustrate an access point, conventional server computer, workstation, desktop computer, laptop, tablet, network appliance, e-reader, smartphone, or other computing device, and can be utilized to execute any of the application and/or logic components presented herein. The device 900 may, in some examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the local area network 940. However, it is contemplated that the device 900 may communicate over a wide-area network or other network type. The chipset 906 can include functionality for providing network connectivity through a network interface card ("NIC") 912, which may comprise a gigabit Ethernet adapter or similar component. The NIC 912 can be capable of connecting the device 900 to other devices over the local area network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, and data, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as one or more applications 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include a demand-based optimization logic 924. The demand-based optimization logic 924 may be configured to carry out various processes and/or methods described above. In certain embodiments, the demand-based optimization logic 924 may be disposed within an ecosystem management tool which may generate and transmit configuration data 930 to various APs within a floorplan area. In more embodiments, the demand-based optimization logic 924 can be configured within an AP which can receive configuration data 930 in the form of reduce power configuration data which can then be parsed to direct the powering down of one or more antennas within the AP. In additional embodiments, the demand-based optimization logic 924 can be utilized to direct and/or train the machine-learning model 926. This can include generating and formatting input data for the machine-learning model 926 and subsequently receiving and processing the output data.

In a number of embodiments, the storage 918 can include demand data 928. Demand data 928 may include the data received from currently tracked user client applications. In further embodiments, the demand data 928 can include or be supplemented by external data associated with one or more identities associated with the floorplan. By utilizing demand data 928, processed historical data 932 can be associated to one or more individual identities within a floorplan area. This can allow for determining and predicting upcoming and current demands of the wireless network within the floorplan.

In various embodiments, the storage 918 can include configuration data 930. As described above, configuration data 930 can include demand-based power configuration data. In more embodiments, this configuration data 930 can include one or more antennas to power down in response to tracked motion and/or predicted motion of individual identities within the floorplan. In additional embodiments, the configuration data 930 can include one or more energy-saving configurations that can be turned on or off within a network device such as, but not limited to, an AP. The configuration data 930 can be updated periodically or in response to certain events, such as the receiving of updated historical data 932.

In still more embodiments, the storage 918 can include historical data 932. The historical data 932 may be configured to include the past ground truths regarding network usage etc. In more embodiments, the historical data 932 can include predicted motions of identities based off of historical usage or personal knowledge of the tracked subject. The predicted motion can be utilized to update or inform the generation of configuration data 930. In further embodiments, additional historical data 932 may be received by the device 900 which can be utilized to direct an update to the configuration data 930. In this way, changes to client applications that are still moving may trigger additional power considerations.

Finally, in many embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to generate predictions of movement. In various embodiments, the ML model 926 can make decisions on which tracked identity and/or associated client application is associated with each potential demand and likely usage.

Although a specific embodiment for a device 900 configured to carry out the processes and/or methods described herein is described above with respect to FIG. 9, any of a variety of devices may be utilized in accordance with embodiments of the disclosure. For example, the device 900 may be utilized as a specialized device, such as an ecosystem management tool. However, other embodiments may be operating the energization optimization logic within one of the APs located within a floorplan, etc. The aspects described in FIG. 9 may also be interchangeable with other elements of FIGS. 1-8 as required to realize a particularly desired embodiment.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a memory communicatively coupled to the processor; and a demand-based optimization logic, configured to:

select a floorplan;

determine a plurality of access points associated with the selected floorplan, wherein the plurality of access points have an output power associated with a signal transmission;

identify a plurality of client devices located within the floorplan;

assess one or more network-based demands of the client devices by parsing demand data indicating at least one application for an upcoming scheduled traffic-related event;

generate a demand-based power configuration for the floorplan in anticipation for an upcoming scheduled traffic-related event, wherein the demand-based power configuration is configured to adjust the output power of one or more of the plurality of access points; and transmit the demand-based power configuration to the plurality of access points.

2. The device of claim 1, wherein the demand-based optimization logic is further configured to establish a communicative connection with the one or more of the plurality of access points.

3. The device of claim 2, wherein the demand-based optimization logic is further configured to request environmental data from the one or more connected access points.

4. The device of claim 2, wherein the demand-based optimization logic is further configured to request configuration data from the one or more connected access points.

5. The device of claim 2, wherein assessing the one or more network-based demands of the client devices includes requesting demand data from the one or more connected access points.

6. The device of claim 5, wherein the at least one application has a known traffic usage pattern.

7. The device of claim 6, wherein the demand-based power configuration is generated based on the known traffic usage pattern of the at least one application.

8. The device of claim 7, wherein the known traffic usage pattern indicates that the output power of one or more of the plurality of access points should be decreased.

9. The device of claim 7, wherein the known traffic usage pattern indicates that the output power of one or more of the plurality of access points should be increased.

10. The device of claim 2, wherein the demand-based optimization logic is further configured to:

access one or more external devices for data; and generating the demand-based power configuration utilizing the accessed data.

11. The device of claim 10, wherein the data is historical data.

12. The device of claim 11, wherein the historical data includes topological demand history.

13. The device of claim 10, wherein the data is environmental data.

14. The device of claim 10, wherein the one or more external devices is a cloud-based ecosystem management tool.

15. The device of claim of claim 2, wherein the demand-based optimization logic is further configured to request configuration data from the one or more connected access points.

16. The device of claim 15, wherein the generation of the demand-based power configuration utilizes the configuration data of a particular access point to determine one or more available output power adjustment options.

17. A network traffic processing device, comprising:

a processor;

a memory communicatively coupled to the processor;

a lower-power transceiver;

a higher-power transceiver; and a demand-based optimization logic, configured to:

establish a wireless connection to an external device;

transmit to the external device:

configuration data associated with the device; and demand data indicating at least one application and associated with at least one of a plurality of client devices;

receive a demand-based power configuration, wherein the demand-based power configuration is generated in anticipation of an upcoming scheduled traffic-related event; and adjust the higher-power transceiver based on the demand-based power configuration.

18. The network traffic processing device of claim 17, wherein the network traffic processing device adjusts the lower-power transceiver based on the demand-based power configuration.

19. A method, comprising:

selecting a floorplan for demand-based optimization;

determining a plurality of access points associated with the selected floorplan wherein the plurality of access points have an output power associated with a signal transmission;

identifying a plurality of client devices located within the floorplan;

assessing one or more network-based demands of the plurality of client devices by parsing demand data indicating at least one application for an upcoming scheduled traffic-related event;

generating a demand-based power configuration for the floorplan in anticipation of the upcoming scheduled traffic-related event, wherein the demand-based power configuration is configured to adjust the output power of one or more of the plurality of access points; and transmitting the demand-based power configuration to the plurality of access points.

* * * * *